(12) United States Patent
Jenkins et al.

(10) Patent No.: US 7,316,207 B2
(45) Date of Patent: Jan. 8, 2008

(54) DEVICES, SYSTEMS AND METHODS FOR INTRODUCING ADDITIVES INTO AN INTERNAL COMBUSTION ENGINE

(75) Inventors: Graeme R. Jenkins, Auckland (NZ); Wayne Rowberry, Auckland (NZ); Eugene Overly, Edmonds, WA (US); Thomas M. Wood, Redmond, WA (US); Glen A. Morgan, Newcastle, WA (US)

(73) Assignee: SIS Power, Inc., Kirkland, WA (US)

( * ) Notice: Subject to any disclaimer, the term of this patent is extended or adjusted under 35 U.S.C. 154(b) by 0 days.

(21) Appl. No.: 10/907,116

(22) Filed: Mar. 21, 2005

(65) Prior Publication Data
US 2005/0257754 A1 Nov. 24, 2005

Related U.S. Application Data

(60) Provisional application No. 60/554,764, filed on Mar. 19, 2004.

(51) Int. Cl.
F02B 47/02 (2006.01)
(52) U.S. Cl. .................. 123/25 B; 123/25 P
(58) Field of Classification Search ............ 123/25 B, 123/25 D, 25 F, 25 P
See application file for complete search history.

(56) References Cited

U.S. PATENT DOCUMENTS

| | | | | |
|---|---|---|---|---|
| 2,400,664 A | | 5/1946 | Tesch ........................ 123/25 |
| 3,968,775 A | | 7/1976 | Harpman .................. 123/25 B |
| 4,005,683 A | * | 2/1977 | Whitt ....................... 123/25 B |
| 4,023,538 A | * | 5/1977 | Harpman et al. ......... 123/25 B |
| 4,027,630 A | * | 6/1977 | Giardini ................... 123/25 P |
| 4,064,852 A | * | 12/1977 | Fulenwider, Jr. ......... 123/25 B |
| 4,300,485 A | | 11/1981 | Goodman |
| 4,368,711 A | * | 1/1983 | Allen ........................ 123/25 B |
| 4,402,182 A | * | 9/1983 | Miller ....................... 123/25 D |
| 4,408,573 A | | 10/1983 | Schlueter et al. .......... 123/25 P |
| 4,409,932 A | * | 10/1983 | Gill ........................... 123/25 D |
| 4,452,215 A | * | 6/1984 | Glass ........................ 123/557 |
| 4,461,245 A | | 7/1984 | Vinokur |
| 4,541,367 A | * | 9/1985 | Lindberg .................. 123/25 F |
| 4,628,871 A | * | 12/1986 | Glass ........................ 123/25 B |
| 4,844,028 A | * | 7/1989 | Volcher .................... 123/25 P |

(Continued)

FOREIGN PATENT DOCUMENTS

CH        655361 A5 * 4/1986

(Continued)

*Primary Examiner*—Noah P. Kamen
(74) *Attorney, Agent, or Firm*—Seed IP Law Group PLLC

(57) ABSTRACT

Device, systems and methods for introducing water into the combustion chamber of an internal combustion engine, incorporating an injector and a heater, are shown and described. The injector is configured to inject water at a pulse rate and frequency controlled by various engine performance readings, and the heater configured to convert the water into steam on demand, and to route the steam into the air stream flowing toward the combustion cylinder. In certain embodiments, the heater is positioned to provide steam to the cylinder before the temperature of the steam changes significantly. In other embodiments, the heater is configured to convert to steam a flow of water equal to or less than the amount of fuel burned by the engine during the same time period.

37 Claims, 14 Drawing Sheets

U.S. PATENT DOCUMENTS

| | | | |
|---|---|---|---|
| 4,913,098 A * | 4/1990 | Battaglini | 123/25 P |
| 5,213,086 A * | 5/1993 | Sims | 123/514 |
| 6,010,544 A | 1/2000 | Haldeman et al. | 44/301 |
| 6,463,890 B1 | 10/2002 | Chomiak | 123/25 P |

FOREIGN PATENT DOCUMENTS

| | | |
|---|---|---|
| EP | 1205659 A2 | 5/2002 |

* cited by examiner

DEVICES, SYSTEMS AND METHODS FOR INTRODUCING ADDITIVES INTO AN INTERNAL COMBUSTION ENGINE

CROSS REFERENCE TO RELATED APPLICATION

This application claims the benefit under 35 U.S.C. § 119(e) of U.S. Provisional Patent Application No. 60/554,764 filed Mar. 19, 2004, where this provisional application is incorporated herein by reference in its entirety.

BACKGROUND OF THE INVENTION

This invention relates to internal combustion engines, and in particular, to devices, systems and methods for introducing water into the combustion chamber prior to or during ignition.

DESCRIPTION OF THE RELATED ART

The subject system utilizes a combination of well documented principles of operation in a novel manner, the system being highly effective in the modification and control of the fuel/air combustion process of internal combustion engines. The subject improvement does not alter the design of the basic engine although it does reduce the need for external exhaust treatment devices for control of emissions. The system does provide for a cooler running engine, increased gas mileage (improved fuel economy), increased engine torque, reduction of objectionable emissions, increased engine performance, substantial elimination of ping and knock, and, finally, reduced carbon buildup.

With respect to the combustion process in internal combustion engines, certain remarks will be made herebelow about the way a hydrocarbon fuel burns in an internal combustion engine, as well as the effect the fuel/air ratio has on the three main atmospheric contaminants discharged by such an engine. These are limited by federal law and include CO (Carbon Monoxide), HC (unburnt hydrocarbons) and NOX (oxides of nitrogen).

For various reasons, a "chemically correct" mixture of fuel and air does not always get the best results by way of limiting contaminating exhaust emissions. Thus, ideally, for maximum power, the fuel/air mixture should be relatively richer, having a greater proportion of fuel. On the other hand, the fuel/air mixture should be leaner, utilizing less fuel than "chemically correct", for the best economy.

Unfortunately, most of the steps that can be taken to reduce the amounts of CO and HC also tend to increase the NOX emission, with some loss in economy. For example, running at moderately lean mixtures, that is, with some excess air, promotes complete combustion. This minimizes the amount of CO and HC developed, but it also increases the combustion temperature to the point that the nitrogen in the air becomes involved in the reaction, causing highly poisonous oxides of nitrogen to be generated.

Other factors and conditions can affect the internal combustion process: flame propagation throughout the explosive mixture, method of ignition, duration of ignition, and turbulence, to name a few.

Of the named factors, turbulence is the most important. The existence or lack of turbulence affects the rate at which combustion takes place and efficiency of the combustion process. Turbulence is set up by the gases during their entry into the combustion chamber and, for rapid flame propagation, the fuel/air mixtures must be in a high rate of turbulence. If the combustion mixture were completely quiescent at the time of ignition, flame propagation would be so slow that, even in a slow speed engine, scarcely half of the fuel/air mixture would be burned before the exhaust valve opens. Further, turbulence becomes more important as the density of the charge is altered by residual exhaust products. As the latter tend to be increased, it decreases the flame temperature and thereby retards the rate of flame propagation.

Further, during periods of severe engine operating conditions, such as high loading at slow speed or engine overheating, the combustion process can be further disrupted with very undesirable results. These undesirable combustion processes include: pre-ignition, auto-ignition, and detonation. These processes produce similar results, although they are caused by different actions. Of the three noted undesirable processes, detonation is the most undesirable and should be eliminated. It is the one most responsible for drop in engine performance. Further, if detonation is to act in the engine for long periods, it may lead to engine damage.

Detonation is most noticeable at full throttle/slow speed operation. It occurs when the rise in temperature and pressure of the unburnt combustion gases combine to be sufficient to cause auto-ignition. The increase in the temperature of the unburnt mixture, often referred to as end-gas, is due to an additional amount of heat received by combustion and radiation from the approaching flame front. The increase in pressure is due to pressure waves transmitted at sonic speed from the burning section of the mixture. Further, when auto-ignition occurs, the burning is practically instantaneous and has the nature of an explosion. Simultaneously, very rapid pressure increases take place. These are responsible for shock waves which impinge upon the cylinder head and cylinder walls, producing the characteristic high pitch knocking sound.

At the present time, there are several methods used for the prevention of detonation. These include retarding the spark, using fuel with higher octane numbers or by the injection of internal coolant such as water or water/alcohol solution.

Since early 1971, the automobile manufacturers of the United States have been required by law to reduce exhaust emissions, improve fuel economy and to increase performance in internal combustion engines. However, in order to accomplish these desired results, modification of the basic combustion process (as an alternative means for producing the three desired results) has received less attention than the addition of costly retrofit exhaust treatment devices such as thermal and/or catalytic oxidation of hydrocarbon and carbon monoxide in the engine exhaust system. Nitrogen oxide generation has been reduced to some extent through a combination of retarded spark ignition timing and exhaust gas recirculation, both factors serving to diminish the severity of the combustion process.

With respect to water injection, tests were carried out by a Mr. Benki, in Hungary, before 1900 and thereafter by numerous researchers both in this country and abroad. These tests showed that the use of the internal coolant such as water had the power to prevent pre-ignition and detonation. In the early days, detonation, especially, was a severe problem because of the low octane value of the fuel available and the trend toward increasing the compression ratio of engines to obtain higher efficiency.

In 1913, a professor B. Hopkinson, in England, carried out extensive tests with water as an internal coolant for horizontal gas engines. So successful was the method that Professor Hopkinson used, that he designed engines without water jackets, using internal cooling only. Oil engines designed in the middle 1920's, for tractor work, with hot bulb ignition, were commonly fitted with water injection equipment to prevent detonation.

Developments in super charged aircraft engines in the time interval from World War I and to the beginning of World War II brought water injection back to life. During World War II, water and water/alcohol injection were used to great success, particularly at take-off and during maximum flight speed.

After World War II, water and water/alcohol injection experience was gained from such use as internal coolants for truck engines and tractor engines. During the period from 1944 to 1959, water injection was particularly researched by several universities in this country, England, Canada and Australia.

With respect to water vapor, as opposed to water injection, per se, it was not until after World War II, when certain German technical documents were translated into English, that two researchers, while conducting combustion gas experiments had found, for example, that the combustion velocity of carbon monoxide and air mixtures increases from 6.3 inches/second for a dry mixture to about 21.6 inches/second for mixtures containing 9.4 percent water vapor. Other researchers in Germany verified these facts and carried tests further in which they found and reported that the combustion velocity of carbon monoxide was not only accelerated by water vapor but also by hydrogen, as well as organic compounds containing hydrogen. This was interpreted as a sign that OH radicals and perhaps H-atoms participated in the reaction. Their presence would in themselves accelerate the reaction, as well as also increase the combustion velocity indirectly by diffusing very rapidly.

Catalytic combustion of CO on quartz surfaces is inhibited by liquid water, whereas the gas reaction is greatly accelerated by water vapor.

BRIEF SUMMARY OF THE INVENTION

The present invention is directed toward devices, systems and methods for use in introducing water into the fuel-air mixture in the combustion cylinder of an internal combustion engine, such as a gas or diesel automotive engine. Embodiments of the system can be designed to introduce water at virtually any location between the air filter and the combustion chamber. As a result, the engine—and the machine using the engine—can operate at an increased fuel efficiency and reduced rate of harmful emissions, both as compared to engines used today.

In one particular embodiment, the system incorporates a heater, a water supply, and an injector. The heater is adapted to convert water to steam on-demand, or otherwise without delay, as the water flows through the heater, and the heater is positioned in close communication with the intake port of the engine such that the steam leaving the heater enters the cylinder before the steam's temperature changes significantly. The heater could use a glow plug, a ceramic heater, an electric heating element, or other suitable means. The water supply, for example an onboard tank or other system, supplies water to the heater. The injector introduces water to the heater—and, in turn, the engine—at a controlled rate and/or frequency.

In another particular embodiment, the system likewise incorporates a heater, a water supply, and an injector, but in this system the heater—which is not necessarily the same as the heater described in connection with the first embodiment—is adapted to convert to steam a quantity of water on demand and at a limited flow rate. As one way of calculating it, less than or equal to about one gallon of water is converted to steam, per each gallon of gas burned by the engine; and, in one particular embodiment, the ratio is less than or equal to about ⅛ gallon of water per gallon of fuel. As a result, the efficiency and energy draw of the heater is substantially reduced as compared to current systems.

The present invention is also directed toward devices for use in manufacturing the above systems and for converting existing systems into systems that operate according to the present invention. In addition, the invention is directed toward methods for introducing water into the fuel-air mixture of an internal combustion engine.

In one particular embodiment, the method incorporates providing a source of water; routing the water to a heater configured to convert the water to steam as the water passes through the heater; routing the heater to a location on the engine where at least air is flowing toward a combustion cylinder; and injecting the water into the heater at a controlled rate.

One of ordinary skill in the art, having reviewed this entire disclosure and the corresponding figures, will appreciate these embodiments and variations as well as other embodiments and variations that can be made to the embodiments shown and described below without deviating from the spirit of the present invention.

DETAILED DESCRIPTION OF THE INVENTION

Figure 1:
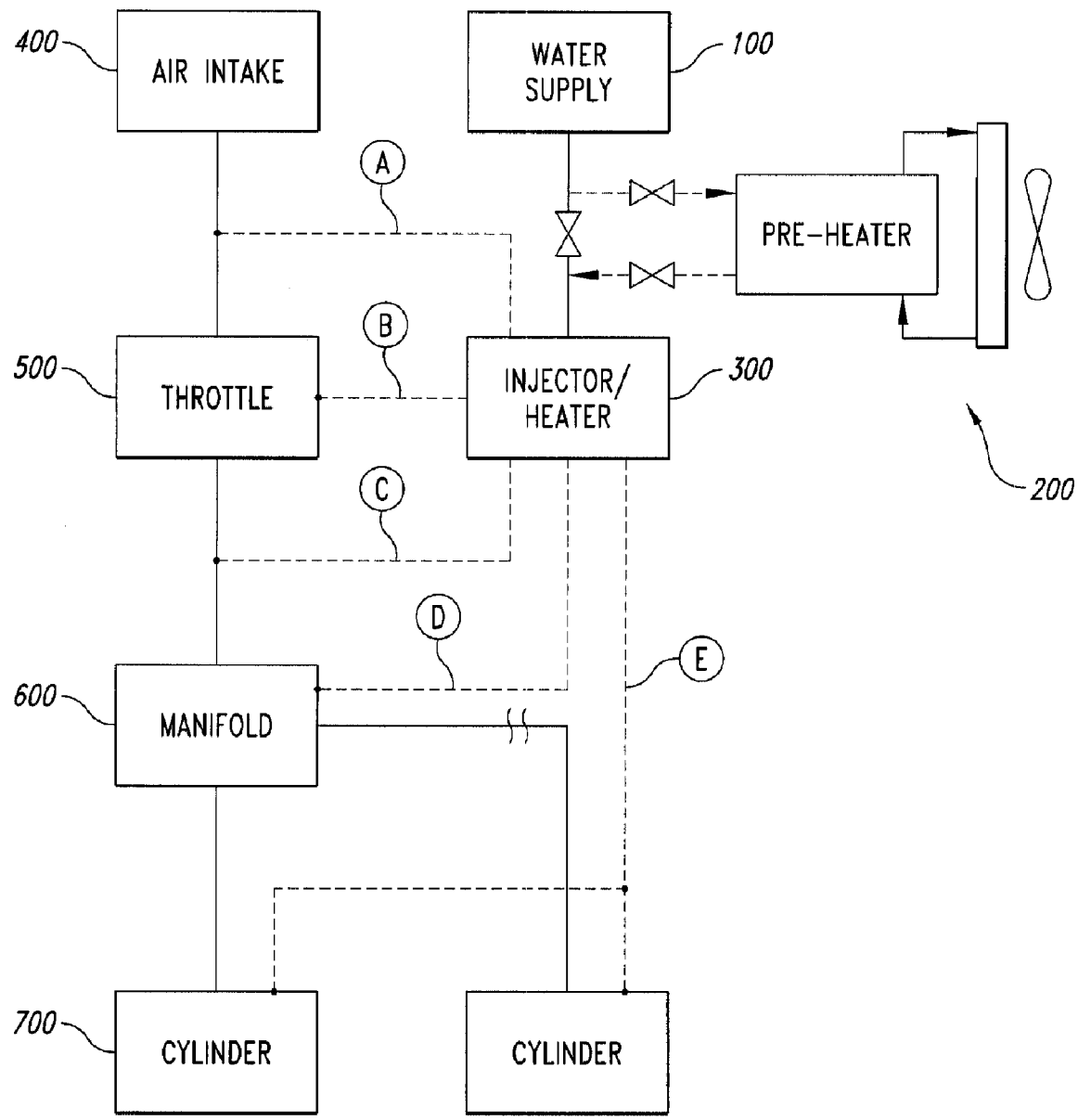
FIG. 1 is a schematic illustration of a system for introducing water into an internal combustion engine, according to an embodiment of the present invention.

The present detailed description is directed toward devices, systems and methods for introducing water into the combustion chamber of an internal combustion engine. Many specific details are provided and illustrated to help explain the construction and operation of the particular embodiments of the invention. The invention could take on other embodiments; one of ordinary skill in the art, having reviewed the present disclosure and corresponding drawings in their entireties, would readily appreciate modifications that could be made to the illustrated embodiments without deviating from the spirit of the invention. Thus the invention is not to be limited to the specific embodiments illustrated in the drawings and described in connection therewith.

FIGS. 1-10 collectively illustrate some of the various embodiments of devices and systems for introducing water into the air-fuel mixture burned in the combustion chamber of an internal combustion engine according to the present invention.

Retrofit Systems for Existing Engines

FIGS. 1-8 illustrate one particular embodiment of the present invention, in which an internal combustion engine is retrofitted to incorporate a system for introducing water into the combustion chamber. Many of the structures, controls and features of the present invention can be fully appreciated through a detailed review of this particular embodiment, and many of those structures, features and controls, as well as their associated advantages, are applicable to all embodiments of the invention. Accordingly, subsequent embodiments of the invention will be described with an understanding that, unless a difference is specified, the following structures, features and controls apply to every embodiment.

FIG. 1 generally illustrates the major sub-systems that would typically be incorporated into a system according to the present invention, and/or those components that may be modified to retrofit a standard engine to support the inventive system. As identified therein by reference numbers, these sub-systems include: a water supply 100, an optional pre-heater 200, an injector/heater 300, an air intake 400, a throttle 500, an intake manifold 600 and one or more combustion cylinders 700. Each of these sub-systems will be illustrated and/or discussed further later in this disclosure, but in general, the water supply 100 retains and supplies process water to the system at a controlled pressure; the optional pre-heater 200 is selectively operated to heat the process water to a desired initial temperature, typically but not exclusively in environments having an extremely low ambient temperature; the injector/heater 300 introduces water into the engine at a controlled flowrate, volume and/or pulse frequency, as determined by a variety of performance criteria, and converts the water to steam as it is introduced into the engine; the air intake 400 introduces ambient air into the engine; the throttle 500 controls the amount of air and/or steam-air mixture delivered to the engine at any particular time; the intake manifold 600 routs the air and/or steam-air mixture to each combustion cylinder; and the cylinder 700 retains the steam-air-fuel mixture during combustion. As illustrated by broken lines in FIG. 1, the steam generated by the injector/heater sub-system 300 can be introduced into the engine at several locations: (A) between the air intake 400 and the throttle 500; (B) into the housing of the throttle 500; (C) between the throttle 500 and the intake manifold 600; (D) into the intake manifold 600, either centrally or at a location dedicated to each intake port; and/or (E) directly into each cylinder 700. An individual of skill in the art, after reviewing this entire disclosure and the corresponding figures, will appreciate the modifications that would be necessary to convert from one option to the next, and the effect each option may have on ease of manufacture and repair, cost, efficiency, performance, and other common engine-design criteria.

Figure 2:
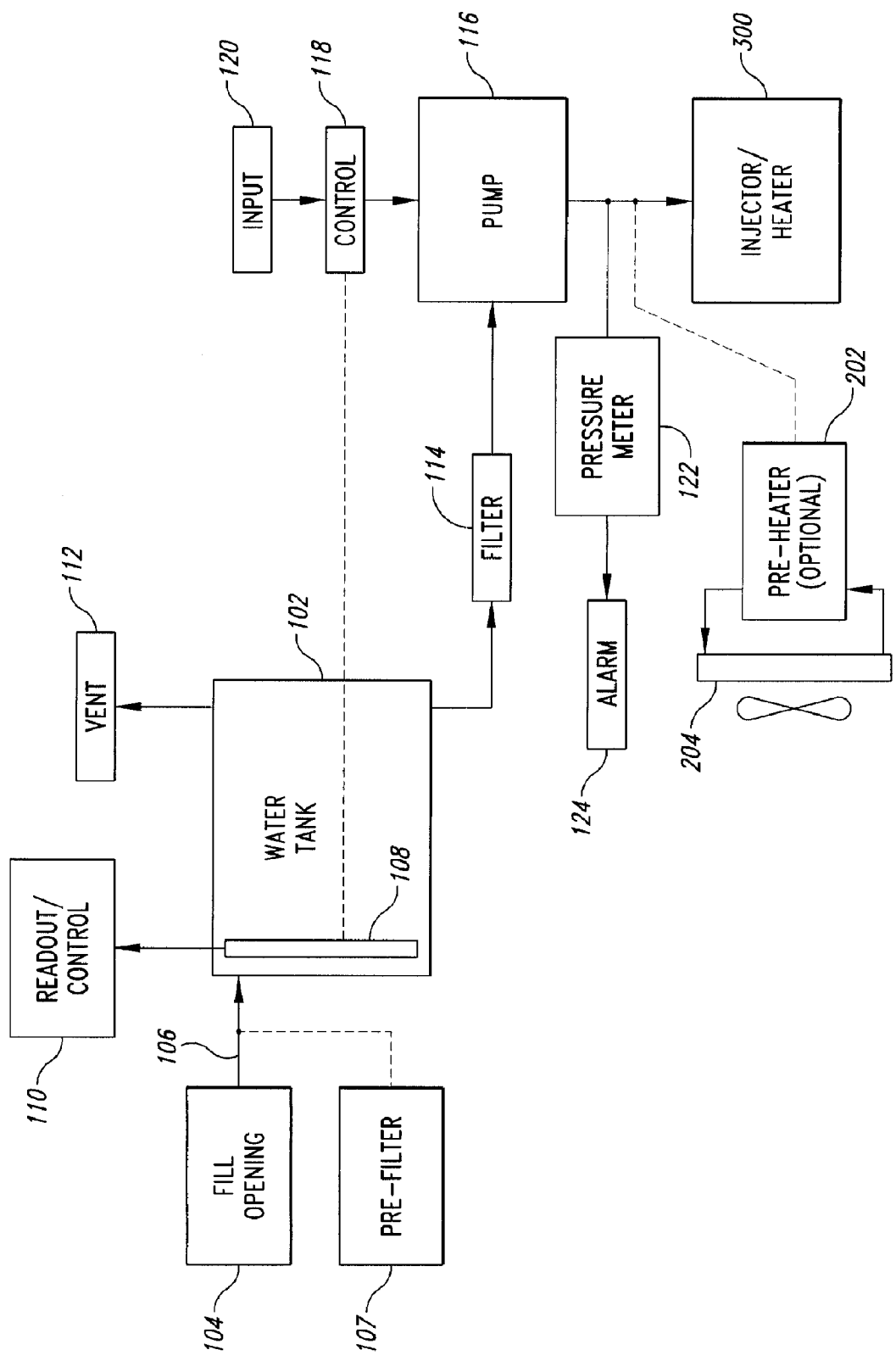
FIG. 2 is a schematic illustration of a water intake sub-system from a system for introducing water into an internal combustion engine, according to an embodiment of the present invention.

FIG. 2 illustrates in more detail one possible design of the water supply 100 and pre-heater 200 sub-systems. Water can be retained in a water tank 102, which can be filled by pouring water into a fill opening 104 attached to the water tank by a fill neck 106. The water tank 102 can be sized based on the size of the engine and the size of the fuel tank, with the goal being that the water tank need not be filled more frequently than the fuel tank. A pre filter 107 may be used to filter water before it enters the water tank 102.

A level sensor 108 in the water tank 102 can send a signal to a display 110, which displays the water level to the driver. The level sensor can also send a signal to the main controller 118, which as discussed below is used in this particular embodiment to control many of the elements of the system. A signal from the level sensor 108 indicating an empty water tank 102 can result in a signal from the controller 118 to other elements in the system to shut of the injector/heater sub-system 300 and other elements of the system (such as the pump, discussed below).

A vent 112 maintains pressure in the water tank 102 at atmospheric pressure, or can be configured to prevent the pressure in the water tank from exceeding a pre-selected pressure before the vent bleeds off air.

Water exits from the bottom of the water tank 102, and can proceed to a filter 114, which removes sediment and other impurities. From the filter 114, the water travels to a pump 116, which can pressurize the water to a desired pressure to optimize performance. A controller 118 receives data from various inputs 120, and can adjust the operation of the pump 116 to maintain optimal water pressure in the system. A pressure meter 122 reads the water pressure, and can display the pressure, feed it back to the controller 118 or another part of the system, and can trigger an alarm 124 should the pressure drop to an unacceptable level. From the pump 116, the pressurized water flows toward the injector/heater 300. In some systems, the pressurized water first flows to the pre-heater 200.

The illustrated pre-heater 200 incorporates a tube-in-tube heat exchanger 202 in which coolant from the radiator 204 flows through one outer tube and pressurized water from the pump 116 flows through the other inner tube. As the coolant heats up, the heated coolant transfers heat to the water and the heated water returns to the system, flowing next toward the injector/heater 300.

Figure 3:
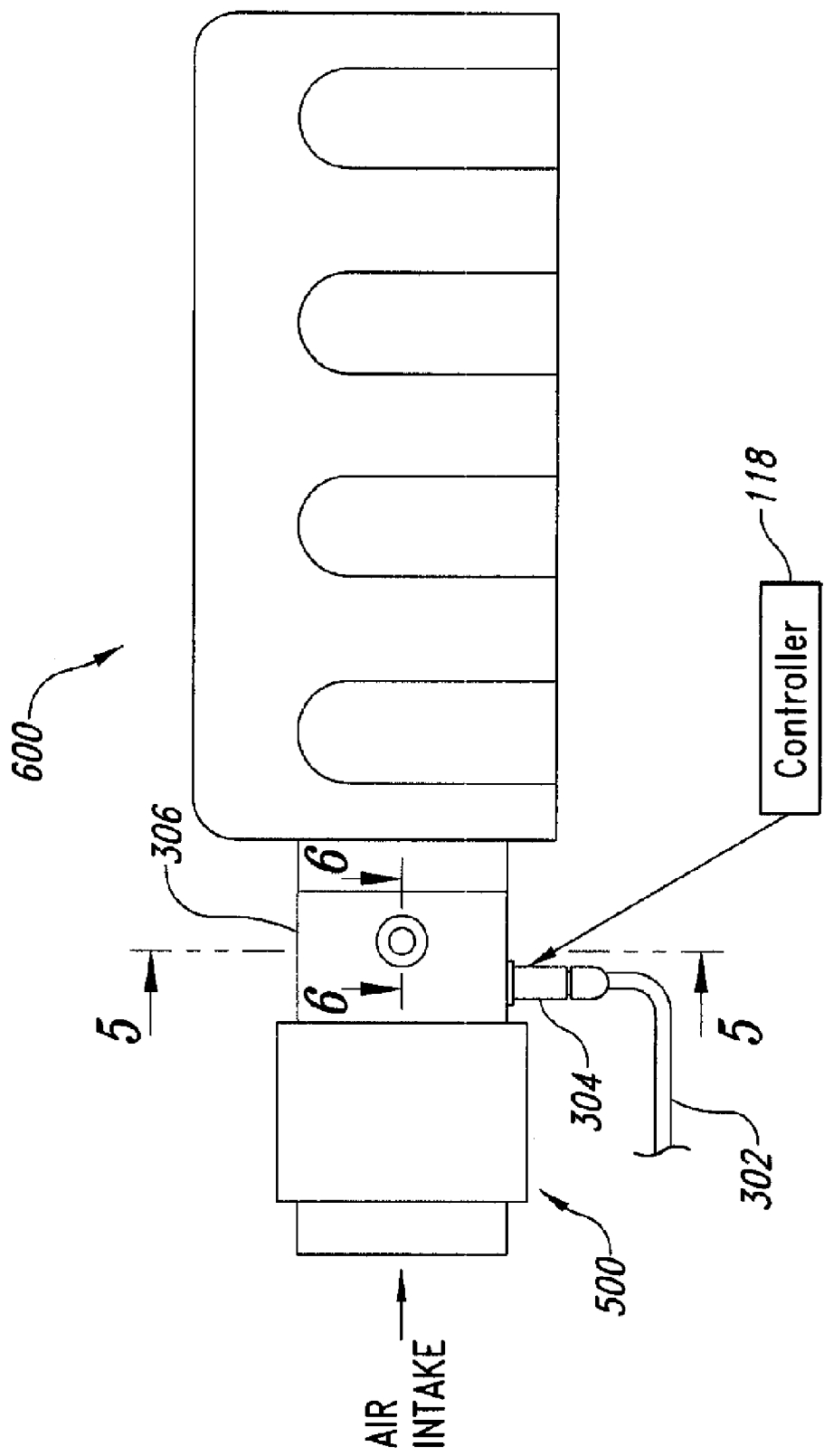
FIG. 3 is a side elevation view schematically illustrating an injector and heater sub-assembly from a system for introducing water into an internal combustion engine according to an embodiment of the present invention, incorporated into a portion of an intake system for an internal combustion engine.

FIGS. 3-6 best illustrate the injector/heater 300 of this particular embodiment. As best illustrated in FIG. 3, a tube 302 can route the water from the pump 116 or the heat exchanger 202, depending on the particular system, to a solenoid valve 304. The illustrated solenoid valve 304 is mounted to the air duct 306 between the throttle 500 and the intake manifold 600. The durations for which the solenoid valve 304 remains open and closed (based, for example, on the pulse width of the incoming signal), and the frequency of the toggling of the solenoid valve—both of which affect the amount of water injected into the system—are controlled by the controller 118. In the illustrated embodiment, a single controller 118 controls the pump 116 and the solenoid valve 304 (and a number of other things discussed below); however, one of ordinary skill in the art, having reviewed this disclosure and the corresponding figures, will appreciate that separate controllers could instead be used.

Figure 4:
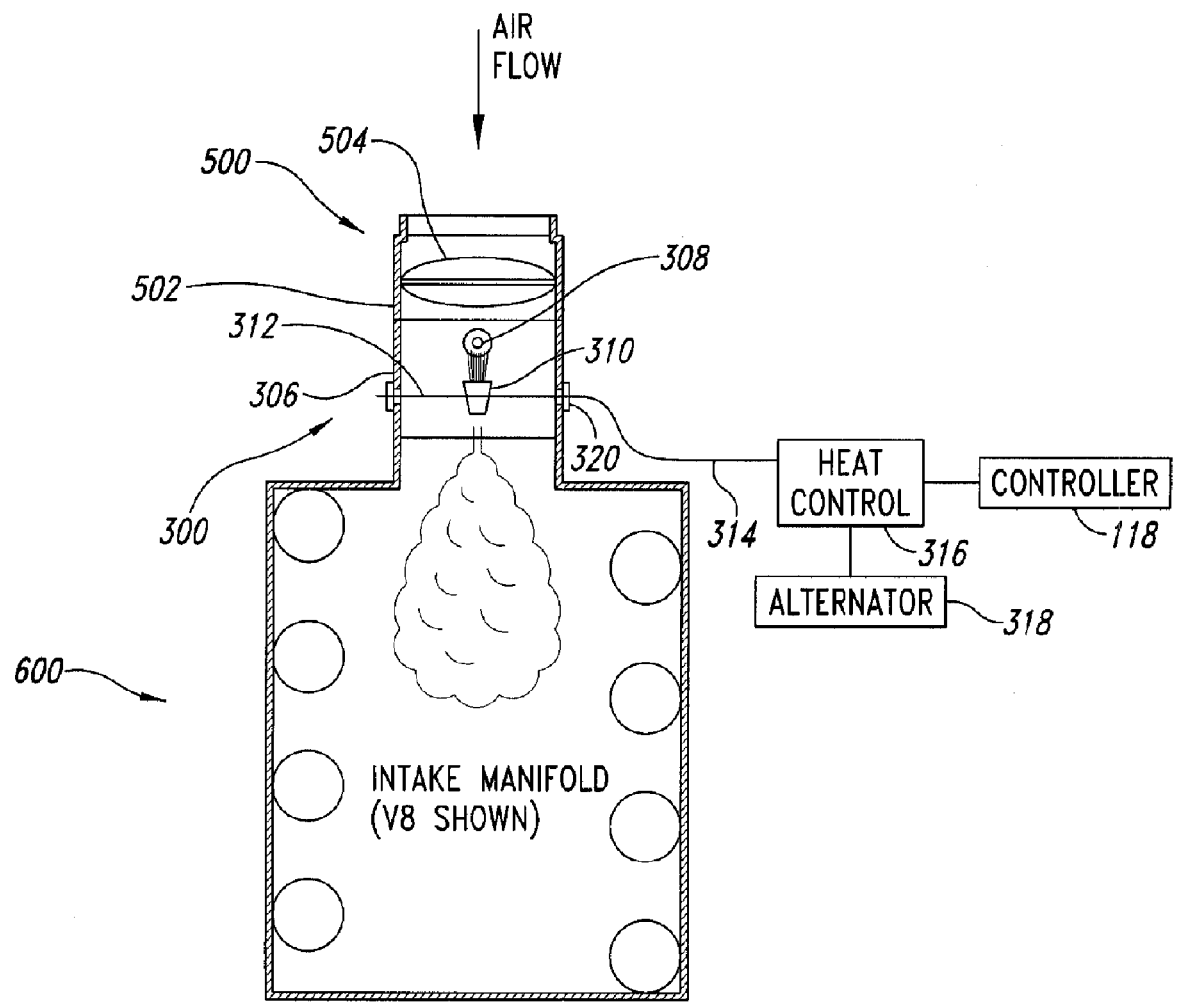
FIG. 4 is a cutaway plan view schematically illustrating the injector and heater sub-assembly and intake system of FIG. 3.

As best illustrated in FIG. 4, the solenoid valve 304 (not shown in this figure) outside the air duct 306 is coupled to a nozzle 308 terminating inside the air duct. The illustrated nozzle 308 is centrally located in the air duct 306 (widthwise as illustrated in FIG. 4) to align with a heating element 310 also centrally located in the air duct. The nozzle 308 is located upstream with respect to the heater element 310, such that water injected into the air duct is carried with the air from the throttle 500 into the heating element.

The nozzle 308 is configured to dispense water in a spray pattern, to disperse the water in a manner conducive to converting the water to steam as the water passes the heating element 310. One of ordinary skill in the art, having reviewed this entire description and the corresponding figures, will appreciate that different nozzles having different flow characteristics and spray patterns can be substituted for that shown and, with minimal experimentation, can determine the affect that each different nozzle has on the performance of the system.

Figure 5:
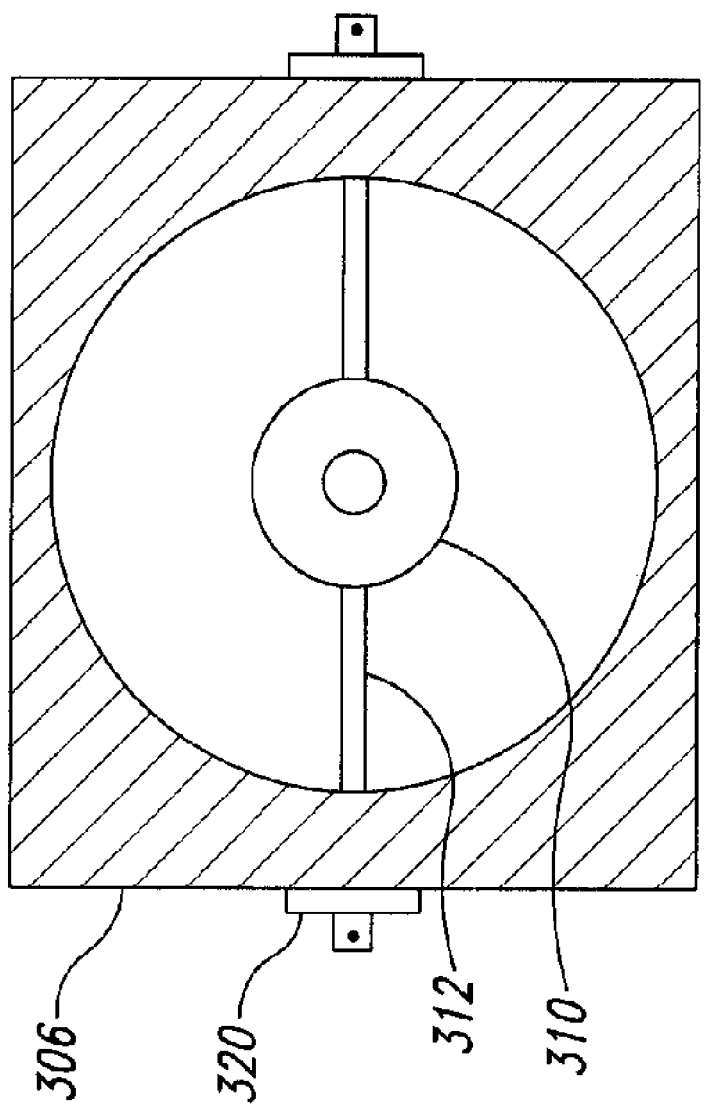
FIG. 5 is an elevational cross-section of the injector and heater sub-assembly of FIG. 3, shown along Section 5-5.
Figure 6:
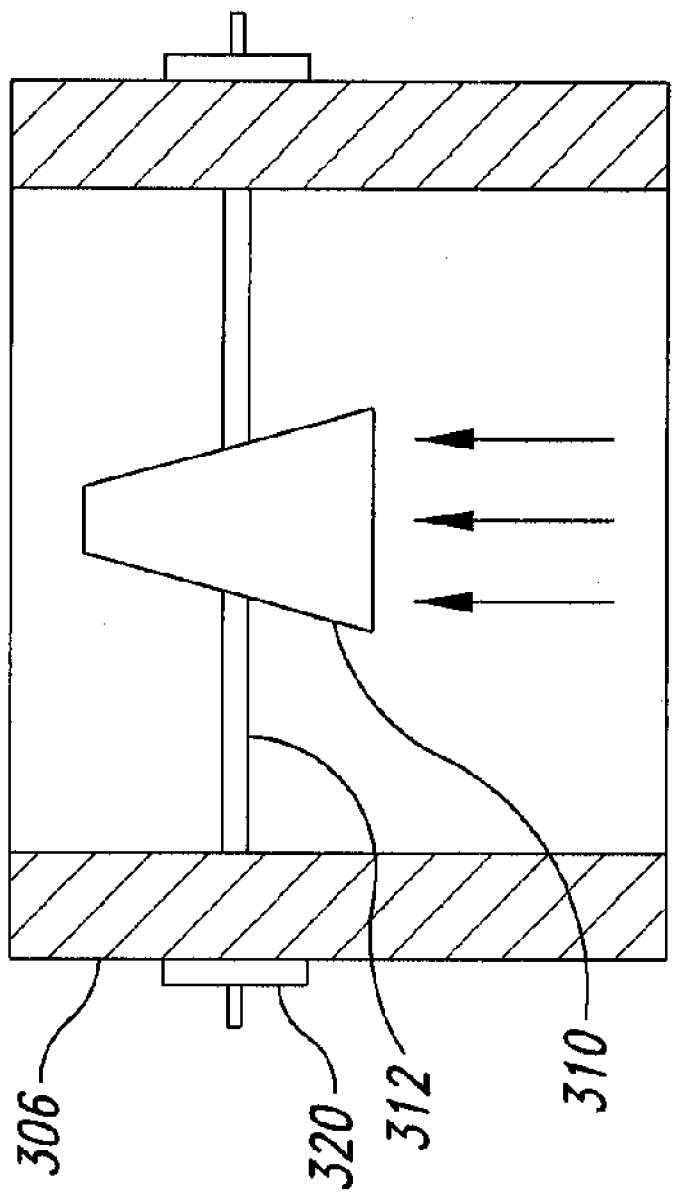
FIG. 6 is a plan cross-section of the injector and heater sub-assembly of FIG. 3, shown along Section 6-6.

As illustrated in FIGS. 4-6, the heating element 310 is mounted in the air duct 306 by a pair of wire mounts 312, which suspend the heating element while affecting the flow of air as little as possible. In one embodiment, the heating element 310 incorporates a pair of glow plugs, e.g. those typically used in a standard diesel engine, alternatingly used to generate the heat. One of ordinary skill in the art, having reviewed this entire description and the corresponding figures, will appreciate that different heating elements, alone or in combination, having different electrical and/or heat characteristics can be substituted for that shown and described and, with minimal experimentation, can determine the affect that each different heating element has on the performance of the system.

One or both of the wire mounts 312 extend to the heating element 310 along with an electrical connector 314 that is coupled at one end to the heating element and at an opposing end to a heater control 316. The heater control 316 adjustably routes electricity from the alternator 318 to the heating element 310, based on control signals sent to the heater control from the controller 118. Again, one of ordinary skill in the art will appreciate that a separate controller could be used in place of the centralized controller 118. The wire mounts 312 and electrical connector 314 are mounted to the air duct 306 with a pair of bushings 320, one or both of which can be electrical insulators.

Returning to FIG. 4, the throttle sub-system 500 is located immediately upstream from the injector/heater 300. In its simplest form, the throttle sub-system 500 incorporates a throttle body 502 and a throttle plate 504. The structure and function of the throttle body 502 and throttle plate 504 need not differ from those currently used in internal combustion engines. The intake manifold sub-system 600 is located immediately downstream of the injector/heater 300.

Figure 7:
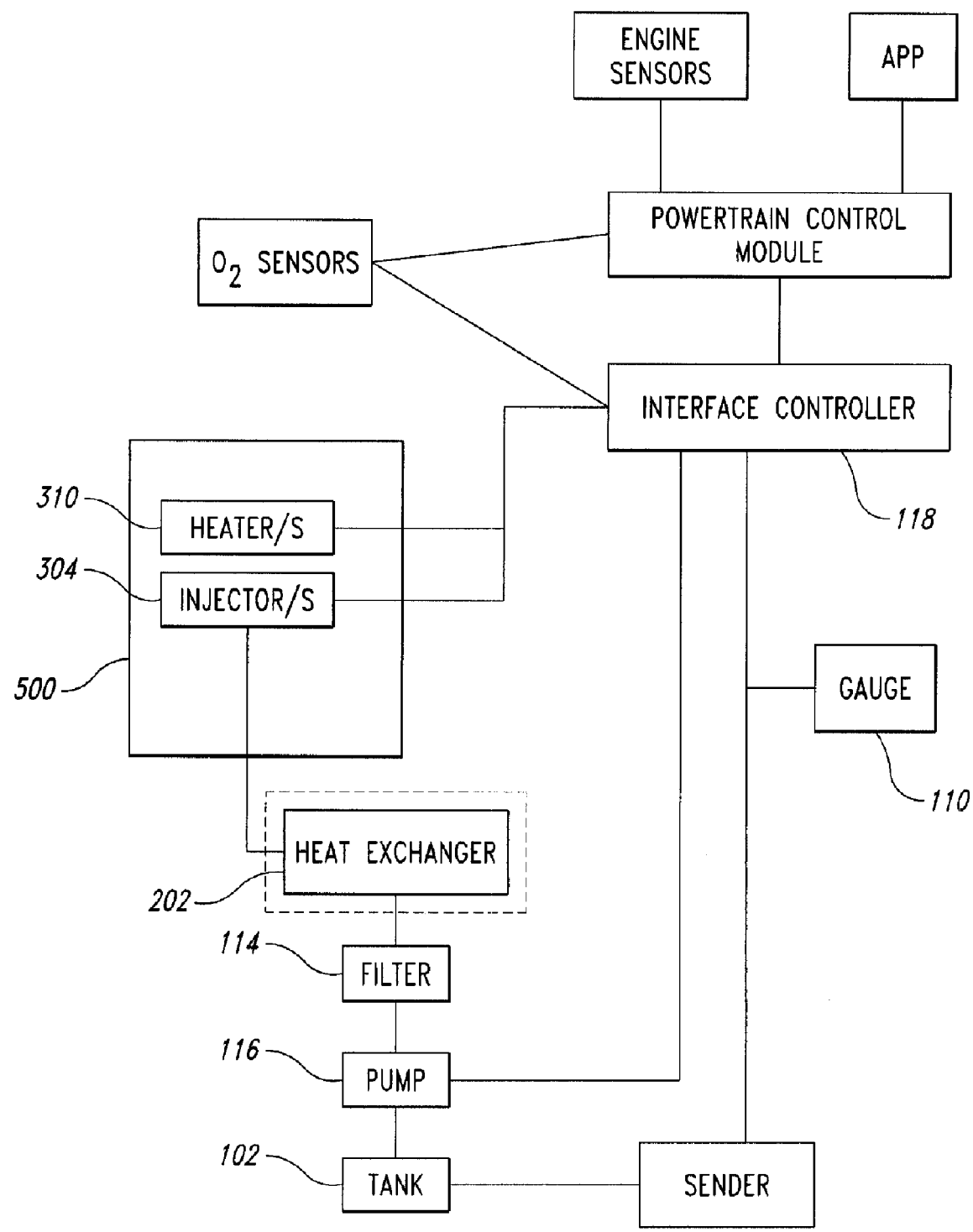
FIG. 7 is a schematic diagram of a control system for a system for introducing water into an internal combustion engine, according to an embodiment of the present invention.
Figure 8:
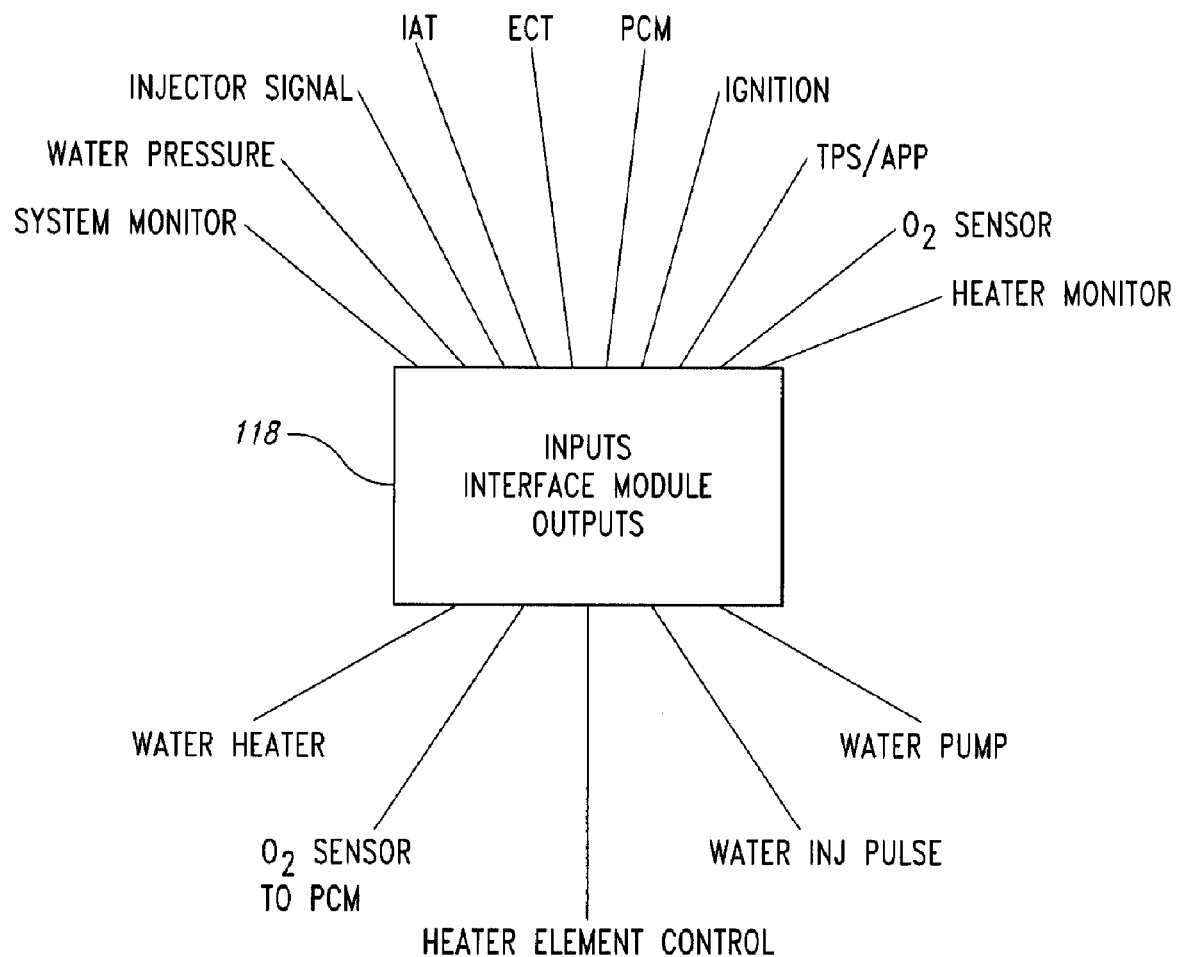
FIG. 8 is a schematic diagram of an interface module for a system for introducing water into an internal combustion engine, according to an embodiment of the present invention.

FIGS. 7 and 8 schematically illustrate aspects of the control system for the illustrated embodiment. One of ordinary skill in the art, having reviewed this entire description and the corresponding figures, will appreciate that different control systems can be substituted for that shown.

Figure 11:
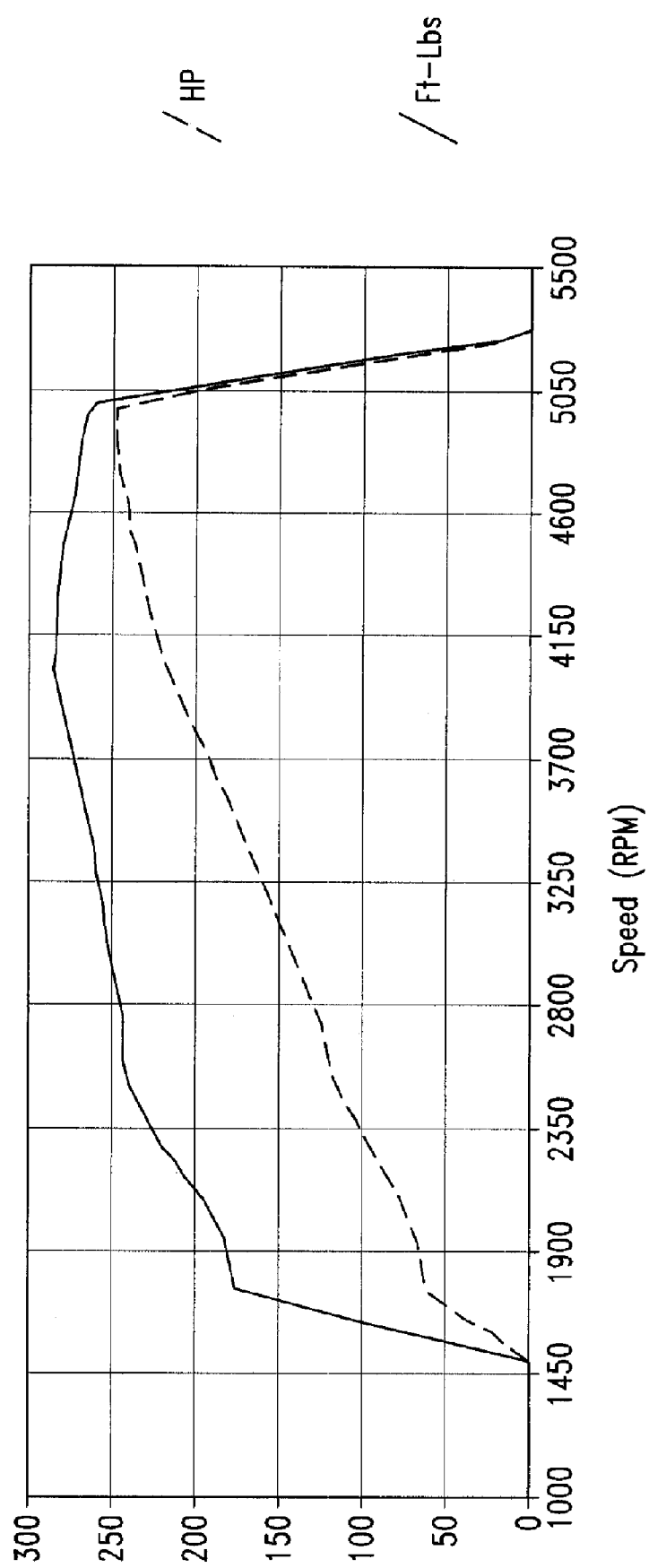
FIG. 11-14 are graphical and schematic illustrations of the performance of certain engines operating with a system according to the present invention.
Figure 12:
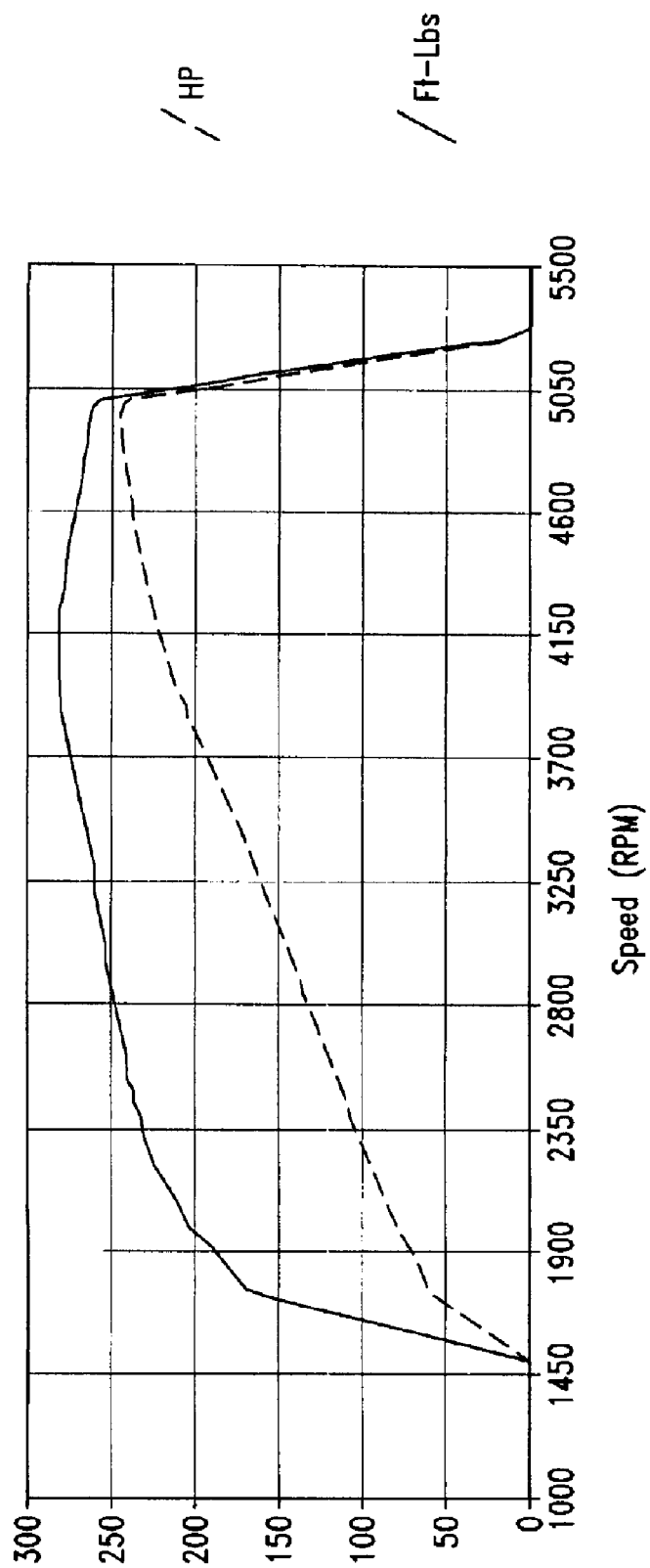
Figure 13:
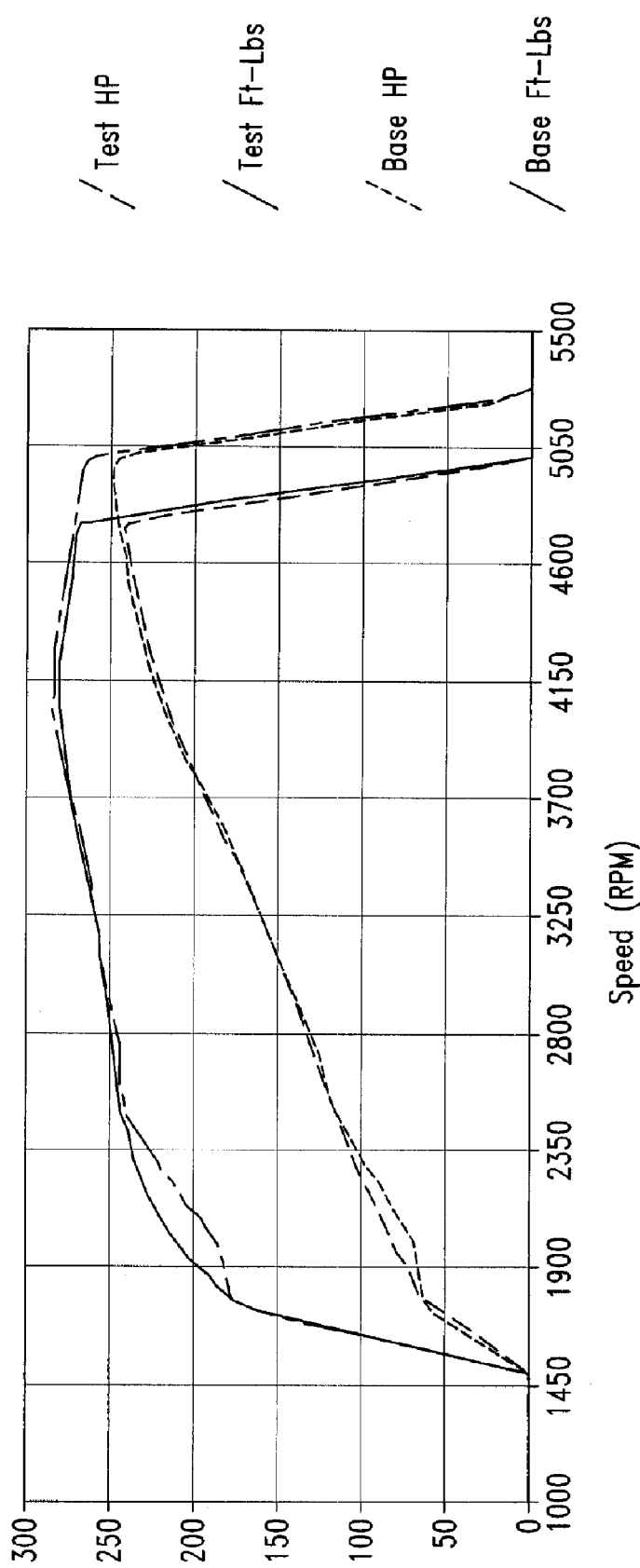
Figure 14:
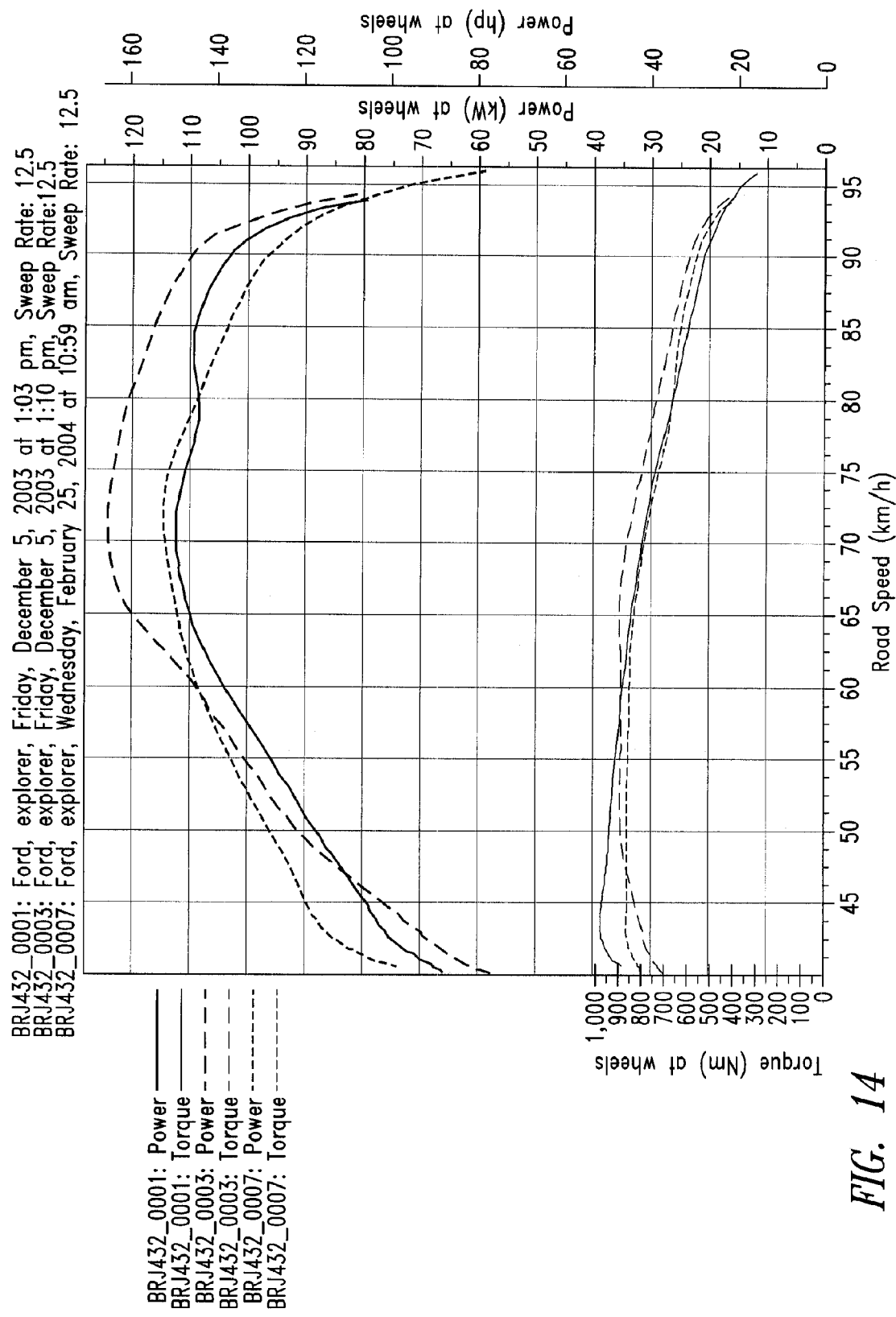

FIGS. 11+ provide test results for the illustrated system under various conditions and on various vehicles. These results are notable not only to show what the illustrated system does; they are also notable to show what the system does not do. For example, the system increased the fuel economy of a Ford Explorer from 19 mpg highway (Ford's figure) or 15.1 mpg highway (Consumer Guide's figure) to 27.2 mpg—an increase of more than 70% over what Consumer Guide suggests to consumers the Ford Explorer realistically attains. Further, independent dynamometer testing showed that the system generated virtually no carbon monoxide and 1 ppm hydrocarbon. The current European standards are 1.5% CO and 400 ppm HC; and the current U.S. standard for hydrocarbon emissions is 340 ppm HC. Notably, while the illustrated system provides these significant benefits to the environment, it does not appear to noticeably reduce engine torque or power.

Manufactured Systems for Injecting Water into Intake Systems

Figure 9:
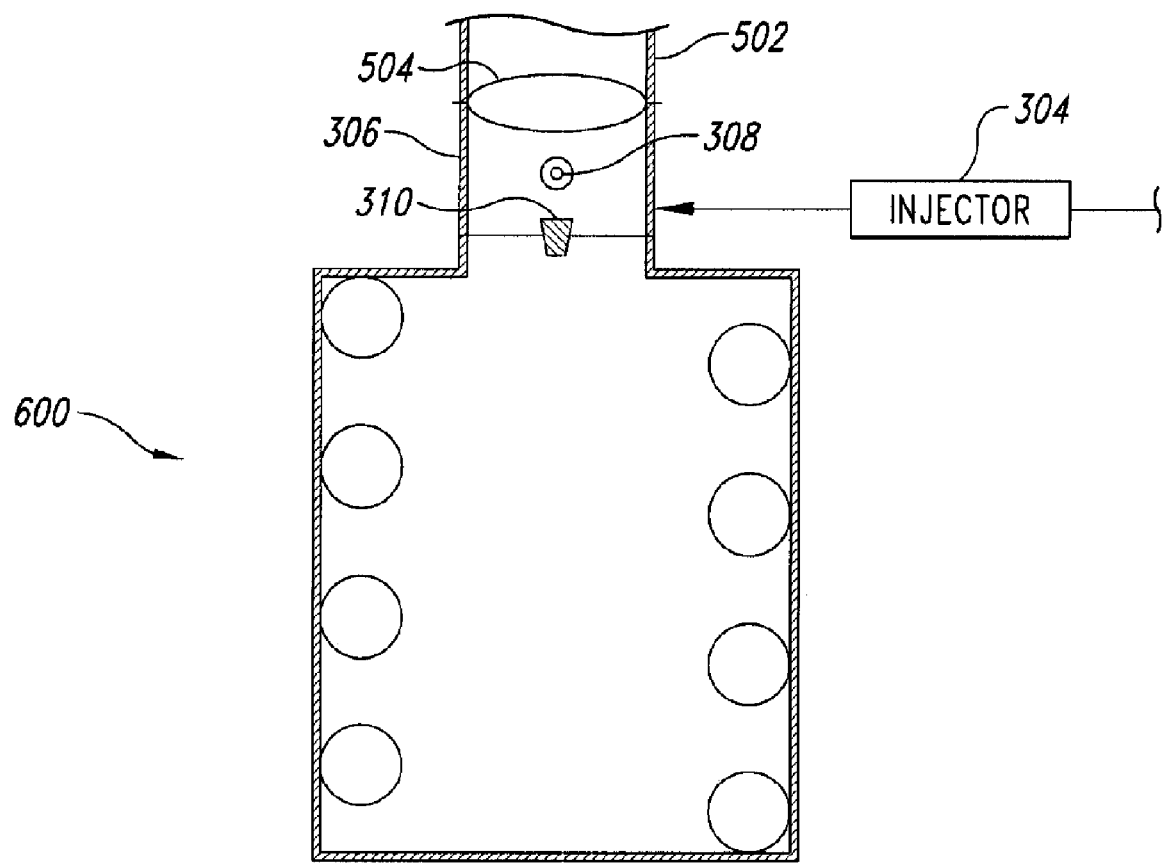
FIG. 9 is a cutaway plan view schematically illustrating an intake system incorporating injector and heater sub-components, according to an alternate embodiment of the present invention.

FIG. 9 illustrates one alternate embodiment of the inventive system. In the illustrated alternate, the air duct 306 is formed as a unit with the intake manifold 600 and/or the throttle body 502. As such, the entire assembly can be manufactured in one or two pieces, which can reduce the cost of installation and maintenance. Unlike the prior embodiment, which is designed to be retrofit onto existing vehicles, the embodiment of FIG. 9 is designed for original manufacture. One of ordinary skill in the art, having reviewed this entire disclosure and the associated figures, will appreciate the details and variations that can be made to the illustrated design to best adapt it for each particular vehicle on which it will be used.

Systems For Injecting Water at or Near Intake Ports

Figure 10:
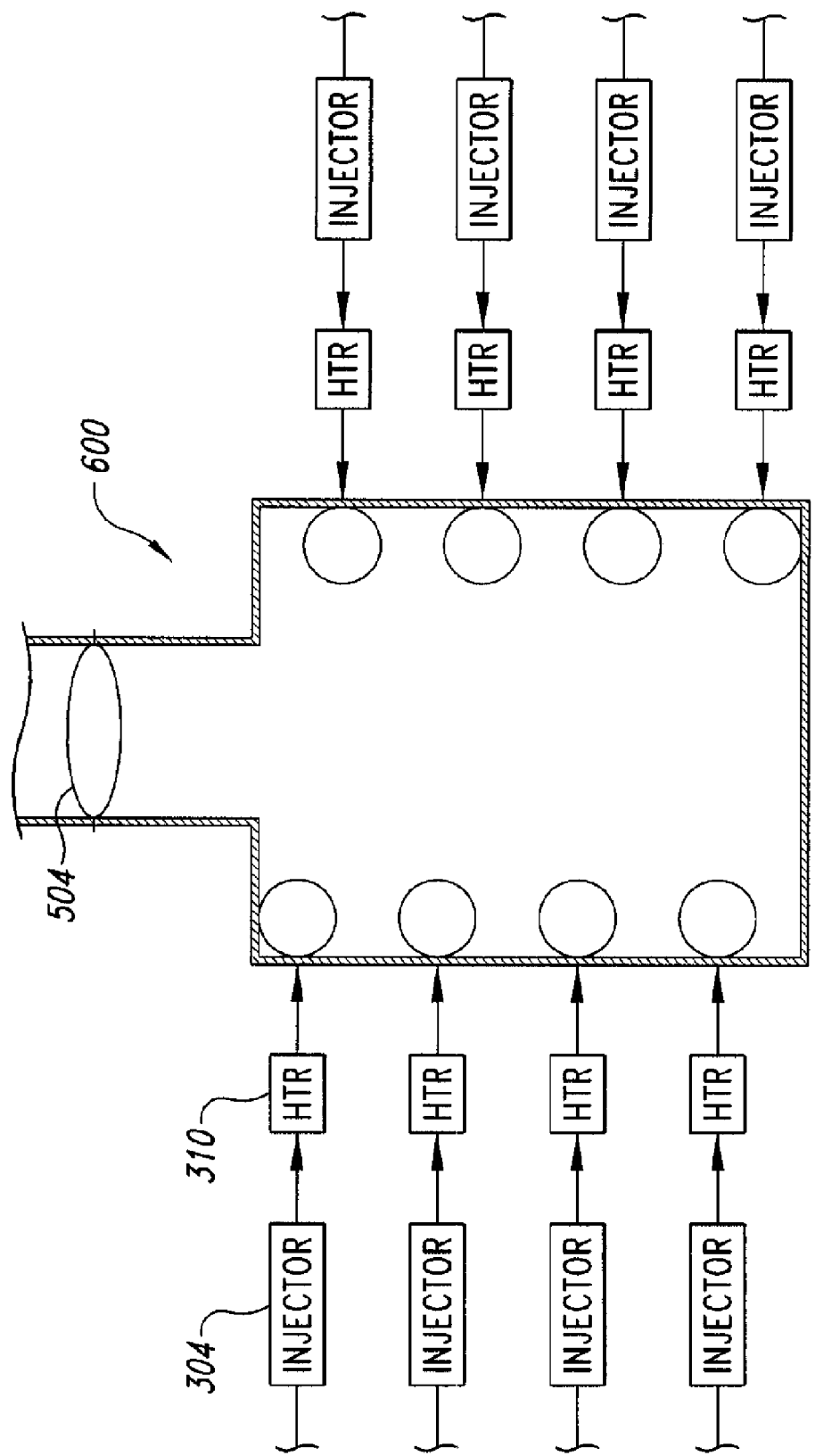
FIG. 10 is a cutaway plan view schematically illustrating an intake system and a plurality of injector and heater sub-assemblies, according to another alternate embodiment of the present invention.

FIG. 10 illustrates yet another alternate embodiment of the present invention. In the illustrated embodiment, several injectors 304 and heaters 310 are used in combination with a multi-cylinder engine. As illustrated, the number of heaters 304 and heaters 310 corresponds with the number of cylinders; however, the ratio could change based on cost, space or other limitations.

The pressurized water from the pump is routed toward the engine and, en route, is divided into several separate lines. Each line contains a single injector 304 and a single heater 310. The heater 310 is then coupled to the intake manifold 600 in a manner that facilitates the passage of steam into the manifold at a location proximate the intake valve for the respective cylinder.

Because each injector 304 and each heater 310 is dedicated to a single cylinder—or perhaps two or more cylinders—the amount of water injected and heated at each heater is less than the amount of water heated by the heater described in the first embodiment. Further, because the respective injectors 304 and heaters 310 are timed based on the respective pistons, the heaters will not all be operating simultaneously. Thus, the amount of electricity drawn by the system at any given time is less than the amount of electricity drawn by the heater 310 in the first embodiment. The illustrated embodiment thus draws less electricity, per unit of time, than the first embodiment, and thus may allow the system to operate using a lower gauge alternator than other embodiments of the system.

SUMMARY

Embodiments of the present invention can have many advantages over systems and methods of the prior art. For example, the present invention may allow engine designers to build engines having a marked increase in fuel economy, as compared to existing engines; to build engines using less water than any existing water/steam-injection system; to build engines that generate emissions at a lower rate, as compared to existing engines; and to build engines that operate at temperatures lower than existing engines. These and other advantages may be appreciated by practicing the present invention.

All of the U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A system for introducing water into the fuel-air mixture of an internal combustion engine, the engine having a combustion chamber and an intake port in communication with the combustion chamber, the system comprising:
   a heater adapted to convert the water to steam, without significant delay, as the water flows through the heater, the heater being in close communication with the intake port of the engine such that the steam leaving the heater enters the intake port before a temperature of the steam changes significantly;
   a water supply adapted to supply the water to the heater; and
   an injector configured to controllably introduce the water to the heater, at least in part, in response to a timing signal generated by the engine.

2. The system of claim 1 wherein the heater is operated by electricity.

3. The system of claim 1 wherein the heater comprises at least one glow plug.

4. The system of claim 1 wherein the heater comprises a ceramic heater.

5. The system of claim 1 wherein the heater operates using microwaves.

6. The system of claim 1 wherein the heater operates by burning fuel.

7. The system of claim 1 wherein the heater is configured to dispense the steam directly into the intake port.

8. The system of claim 1 wherein the water supply includes a tank.

9. The system of claim 1 wherein the injector is located upstream of the heater.

10. The system of claim 1 wherein the injector includes a solenoid valve.

11. The system of claim 1 wherein the injector is controlled, at least in part, in response to a signal generated by the engine.

12. The system of claim 1 wherein the injector is controlled, at least in part, in response to a temperature signal generated by the engine.

13. The system of claim 1 wherein the injector is controlled, at least in part, in response to an emission component signal generated by the engine.

14. The system of claim 1 wherein the heater and the injector are independent components.

15. A system for introducing water into the fuel-air mixture of an internal combustion engine, the engine having a combustion chamber and an intake port in communication with the combustion chamber, the system comprising:
   a heater adapted to convert the water to steam, without significant delay, as the water flows through the heater, the heater being in close communication with the intake port of the engine such that the steam leaving the heater enters the intake port before a temperature of the steam changes significantly;
   a water supply adapted to supply the water to the heater; and
   an injector configured to controllably introduce the water to the heater;
   wherein the heater and the injector are coupled to a single housing.

16. The system of claim 1 wherein the heater is mounted to the engine.

17. The system of claim 1 wherein the heater is configured to be installed in a water line.

18. The system of claim 1 comprising a plurality of heaters and a plurality of injectors.

19. The system of claim 1 comprising a plurality of heaters and a plurality of injectors, the number of heaters and injectors corresponding to the number of cylinders.

20. A water heater for use in combination with an internal combustion engine adapted to convert a supply of water to steam, without significant delay, as the water flows through the heater, the heater being configured to be coupled to an intake port of the internal combustion engine such that the steam leaving the heater enters the intake port before a temperature of the steam changes significantly, and wherein the heater is configured to be mounted directly on the intake port.

21. The heater of claim 20 wherein the heater is configured to be mounted on the engine.

22. The heater of claim 20 wherein the heater is configured to be installed in a water line.

23. The heater of claim 20, further comprising an injector configured to control a supply of water to the heater.

24. The heater of claim 20, further comprising an injector coupled to the heater and configured to control a supply of water to the heater.

25. A water heater for use in combination with an internal combustion engine adapted to convert a supply of water to steam, without significant delay, as the water flows through the heater, the heater being configured to be coupled to an intake port of the internal combustion engine such that the steam leaving the heater enters the intake port before a temperature of the steam changes significantly, further comprising an injector mounted directly on the heater and configured to control a supply of water to the heater.

26. A method for introducing water into the fuel-air mixture of an internal combustion engine, the method comprising:
   providing a source of water;
   routing the water toward a location on the engine where at least air is flowing toward a combustion cylinder;
   routing the water to a heater configured to convert the water to steam as the water passes through the heater; and
   injecting the water into the heater at a controlled rate, wherein injecting the water comprises injecting small quantities of water in response to a signal from the engine.

27. The method of claim 26 wherein providing a source of water comprises mounting a water tank to a vehicle.

28. The method of claim 26 wherein routing the water to the heater comprises routing the water to a pump and pumping the water toward the heater.

29. The method of claim 26 wherein routing the water to the heater comprises routing the water to an injector in communication with the heater.

30. The method of claim 26 wherein routing the water toward a location on the engine comprises routing the water toward an air intake fitting for the engine.

31. The method of claim 26 wherein routing the water toward a location on the engine comprises routing the water toward a throttle component for the engine.

32. The method of claim 26 wherein routing the water toward a location on the engine comprises routing the water toward an intake port for the engine.

33. The method of claim 26 wherein routing the water toward a location on the engine comprises routing the water toward a combustion cylinder for the engine.

34. The method of claim 26 wherein injecting the water comprises repeatedly injecting small amounts of water toward the heater.

35. The method of claim 26 wherein injecting the water comprises injecting water directly into the heater.

36. The method of claim 26 wherein injecting the water comprises injecting small quantities of water in response to a signal from the engine.

37. The method of claim 26 wherein injecting the water comprises injecting a stream of water into a single heater.

* * * * *